United States Patent
Yoran et al.

(10) Patent No.: US 11,193,007 B2
(45) Date of Patent: Dec. 7, 2021

(54) XRF-IDENTIFIABLE TRANSPARENT POLYMERS

(71) Applicants: SECURITY MATTERS LTD., Kibbutz Ketura (IL); SOREQ NUCLEAR RESEARCH CENTER, Yavne (IL)

(72) Inventors: Nadav Yoran, Tel Aviv (IL); Tzemah Kislev, Mazkeret Bathya (IL); Yair Grof, Rehovot (IL); Haggai Alon, Kibbutz Naan (IL); Mor Kaplinsky, Herzliya (IL)

(73) Assignees: Security Matters Ltd., D.N. Hevel Eilot (IL); SOREQ NUCLEAR RESEARCH CENTER, Yavne (IL)

( * ) Notice: Subject to any disclaimer, the term of this patent is extended or adjusted under 35 U.S.C. 154(b) by 183 days.

(21) Appl. No.: 16/340,913

(22) PCT Filed: Oct. 1, 2017

(86) PCT No.: PCT/IL2017/051112
§ 371 (c)(1),
(2) Date: Apr. 10, 2019

(87) PCT Pub. No.: WO2018/069917
PCT Pub. Date: Apr. 19, 2018

(65) Prior Publication Data
US 2019/0284377 A1     Sep. 19, 2019

Related U.S. Application Data

(60) Provisional application No. 62/406,140, filed on Oct. 10, 2016.

(51) Int. Cl.
| | | |
|---|---|---|
| *C08L 23/06* | (2006.01) | |
| *C08K 3/105* | (2018.01) | |
| *C08K 3/01* | (2018.01) | |
| *C08K 3/11* | (2018.01) | |
| *C08J 5/18* | (2006.01) | |
| *C08K 3/08* | (2006.01) | |
| *C08L 23/12* | (2006.01) | |
| *G01N 23/223* | (2006.01) | |
| *C08K 3/10* | (2018.01) | |

(52) U.S. Cl.
CPC ............... *C08L 23/06* (2013.01); *C08J 5/18* (2013.01); *C08K 3/01* (2018.01); *C08K 3/08* (2013.01); *C08K 3/10* (2013.01); *C08K 3/105* (2018.01); *C08K 3/11* (2018.01); *C08L 23/12* (2013.01); *G01N 23/223* (2013.01); *C08J 2323/06* (2013.01); *C08J 2323/12* (2013.01); *C08L 2201/10* (2013.01); *C08L 2203/16* (2013.01); *C08L 2310/00* (2013.01); *G01N 2223/0766* (2013.01)

(58) Field of Classification Search
CPC .......... C08L 23/06; C08L 23/12; C08K 3/01; C08K 3/08; C08K 3/10; C08K 3/105; C08K 3/11; C08J 5/18
See application file for complete search history.

(56) References Cited

U.S. PATENT DOCUMENTS

| | | |
|---|---|---|
| 6,332,940 B1 | 12/2001 | Lin |
| 8,427,810 B2 | 4/2013 | Stadlbauer et al. |
| 8,590,800 B2 | 11/2013 | Baque |
| 2005/0288416 A1 | 12/2005 | Lichtenstein et al. |
| 2009/0129541 A1 | 5/2009 | Ong et al. |

FOREIGN PATENT DOCUMENTS

FR     2 882 059 A1     8/2006

OTHER PUBLICATIONS

Arkema; FR 2882059 machine translation (Year: 2006).*
DATABASE Thomson Scientific, London GB. XP002776989 Dec. 26, 2013.

* cited by examiner

*Primary Examiner* — Edward J Cain
(74) *Attorney, Agent, or Firm* — Vorys, Sater, Seymour and Pease LLP; Anthony Venturino

(57) ABSTRACT

The invention provides formulations and masterbatches of a polymeric material and XRF-identifiable markers, for producing transparent elements including a polymer and at least one XRF-identifiable marker for a variety of industrial uses.

18 Claims, No Drawings

XRF-IDENTIFIABLE TRANSPARENT POLYMERS

TECHNOLOGICAL FIELD

The invention generally concerns transparent polymers comprising X-ray fluorescence identifiable markers and methods of marking and authenticating transparent products.

BACKGROUND

Transparent polymers are widely used for products in various fields and industries, such as building and construction, healthcare, packaging, houseware, electronics and appliances, as well as in the automotive and aircraft industries.

Transparent polymeric products, such as pipes, wire insulation, weather stripping, fencing, deck railings, plastic films and sheeting, are manufactured by several methods such as extrusion, molding and forming methods. Extrusion involves raw plastic melting formed into a continuous profile. The raw feedstock material for the extrusion process is a solid plastic material typically in resin form, which is fed from a top mounted hopper into the barrel of the extruder.

Defects or deviations of a polymeric product (e.g., plastic product) from the specifications of the manufacturing process may result from improper installation or operation of the extruder, poor mixing of the components or addition of materials, over-heating, etc. The resulting defective product may exhibit variations in the thickness of the product or wall thickness, bubbles and pits, contamination by foreign materials, inhomogeneity, and even particles of undispersed additives. Some of these defects are difficult to detect and identify during continuous production.

In addition, after production of the polymeric product, it is difficult to detect degradation (e.g., detection of defects) in the product during its use due to exposure to various conditions, such as, temperature, exposure to sunlight, exposure to oxidizing materials, etc.

X-ray fluorescence (XRF) has been utilized in the past for the purpose of identifying products based on XRF marking present on the product. In XRF the emission of characteristic "secondary" (or fluorescent) X-rays from a material that has been excited by primary X-rays or gamma rays radiation is detected. The term fluorescence refers to the absorption of radiation of a specific energy resulting in the re-emission of radiation of a different energy (typically lower). The XRF phenomenon is based on the fact that when materials are exposed to short-wavelength X-rays or gamma rays, they expel electrons from inner orbitals of the atom, which thus causes electrons in higher orbitals to "fall" into the lower/inner orbital, and, in the process, release photons with energy equal to the energy difference between the two orbitals involved.

Different chemical elements have electronic orbitals/shells of different characteristic energies, and therefore the spectral profile of an XRF response from an object/material is indicative of the chemical elements and possibly of the amount of each element included in the material/object.

U.S. Pat. No. 6,332,940 [1] is directed to a process for producing a BOPP film that comprises 10-50% w/w calcium carbonate.

U.S. Pat. No. 8,427,810 [2] is directed to measuring residues in BOPP films by XRF analysis.

U.S. Pat. No. 8,590,800 [3] is directed to introducing markers into, inter alia, plastic products.

None of these publications deal with the challenge of marking and authenticating transparent polymeric products while not deviating from the product's initial optical and mechanical properties.

Thus, the need remains for a technology that would have the capability to monitor deviations in the continuous production of transparent polymeric products, but yet also attempts at maintaining the initial properties of such products.

REFERENCES

[1] U.S. Pat. No. 6,332,940
[2] U.S. Pat. No. 8,427,810
[3] U.S. Pat. No. 8,590,800

GENERAL DESCRIPTION

The invention disclosed herein concerns methods for marking and authenticating transparent polymeric products, specifically, thermoplastic products, by utilizing X-ray fluorescence (herein: "XRF") markers, which provide an indication whether the product has a defect, or whether the product has undergone deviation from a predefined continuous manufacturing process.

The technology disclosed herein is not only limited to detecting and identifying deviations in transparent polymeric products during continuous manufacturing process, but also to detecting and identifying deviations in these products after manufacture due to exposure to various conditions, such as, temperature, sunlight, oxidizing materials, irradiation, etc.

The marking method is based on the application or addition of XRF-detectable markers to transparent polymeric products, thereby authenticating them, namely detecting if during continuous production, the product has exhibited one or more of variations in the product's features from the predefined features specified in the specification of the product manufacturing process; namely, the product's thickness, structure, bubbles and pits, contamination by foreign materials during production, inhomogeneity, and particles of undispersed additives, etc.

As such, a combination of a transparent polymeric element with XRF markers is desirable in certain applications, such as, but not limited to, the building and construction industry, healthcare, packaging, houseware, electronics and appliances, food packaging industry, medical applications, in which use of XRF-markers for authentication and identification is especially desired. However, when XRF-markers are combined in the element, the element is rendered with inferior properties, namely, the optical properties (e.g., transparency, glossiness, haziness) and integrity of the element in comparison to an unmarked element is deteriorated.

Thus, an aim of the invention disclosed herein is to provide a transparent polymeric product with XRF-identifiable markers that maintains substantially identical physical properties to those of a neat product (i.e., free of XRF-identifiable markers), such as transparency, glossiness, strength and thickness.

In one of its aspects, there is provided a transparent element comprising a polymer and at least one XRF-identifiable marker, said element comprising between 50 and 200 ppm of said at least one XRF-identifiable marker, and said element having at least one optical property substantially identical to the at least one optical property of a polymer free of said at least one XRF-identifiable marker.

The element according to the invention disclosed herein refers to a transparent polymer having a defined shape and/or structure, comprising at least one XRF-identifiable marker that is incorporated in predefined regions in the bulk (the material volume itself) or surface of the element. For example, the element can be in a form selected from an article, a film, a sheet, a pellet, a plastic part, a substantially 2-dimentional structure, a 3-dimentional structure, etc.

The element can be provided as a stand-alone element or can comprise two or more transparent materials adhered to one another to form, e.g., a laminate, a sandwich structure, a multilayered structure, a stacked structure, etc.

As used herein, the term "polymer" should be understood as having the general meaning known by those skilled in art. Although not limited to, the polymer utilized according to the invention may be a plastic material. In some embodiments, the polymer is a thermoplastic polymer, i.e., exhibits a property in which a solid or essentially solid material turns upon heating into a hot flowable material and reversibly solidifies when sufficiently cooled. The term also denotes that the material has a temperature or a temperature range at which it becomes a hot flowable material.

In some embodiments, the polymer is selected from polyolefins (e.g. high density polyethylene (HDPE), low density polyethylene (LDPE), polypropylene (PP)); polyethylene terephthalate (PET); polystyrene (PS); polyvinylchloride (PVC); polyurethane (PU); polyamides (PA); polyacrylonitriles; polyimides; polyvinyl alcohols and biaxially oriented polymer.

In such embodiments, the polyolefin is selected from polypropylene and polyethylene.

In some embodiments, the polymer is a biaxially oriented polymer. In some embodiments, the biaxially oriented polymer is biaxially oriented polypropylene (herein: "BOPP").

A biaxially oriented polymer (herein: "BOP") generally refers to a polymer that is stretchable to a defined extent in both machine direction (longitudinal) and across machine direction (transverse) without breaking, resulting in a polymer with superior strength, density, flatness and transparency. The length of the sample increases during stretching in longitudinal direction, and subsequently, the width of the sample increases when the sample is stretched in a transverse direction.

Biaxially oriented polymers, such as biaxially oriented polypropylene transparent elements (e.g., BOPP films), are used as packaging films in various applications. They are advantageous since they possess various properties, such as high transparency, gloss, barrier to water and oxygen, integrity, hardness, among others.

A combination of BOP with X-ray fluorescence (herein: "XRF") markers is particularly desirable in certain applications, such as in industries that commonly utilize biaxially oriented polymeric films, including packaging films for marking commercial products typically used by humans or animals, such as food products, food packaging, pharmaceuticals, cosmetics, veterinary products, alcoholic products and others. However, the technology described herein is not only limited to this specific applications and may be utilized in other various applications, such as, electrical applications, printing, flower packing, pressure sensitive tapes and lamination.

In another aspect, there is provided a transparent element (e.g., film) comprising a biaxially oriented polymer (BOP) and at least one XRF-identifiable marker, said element comprises between 50 and 300 ppm of said at least one XRF-identifiable marker, said element having at least one optical property substantially identical to the at least one optical property of a biaxially oriented polymer free of said at least one XRF-identifiable markers.

The XRF-identifiable marker in accordance with the present invention is a substance which includes at least one compound or element identifiable by XRF signature, namely, can be identified by XRF analysis (e.g., by an XRF analyzer), and which may be incorporated into a polymeric element without substantially affecting the physical properties (i.e., optical and mechanical properties) of same polymeric element free of XRF-identifiable marker. XRF analysis, that is analysis of the response X-ray signal, can be carried out by a suitable spectrometer such as XRF analyzer which may operate in uncontrolled environment without vacuum conditions (e.g. energy dispersive XRF analyzer which may be a benchtop, mobile or handheld device)

The markers utilized in accordance with the present invention may be dispersed in the polymer disclosed herein or in a formulation for providing the element according to the disclosed invention, and as will be further detailed below.

The XRF-identifiable marker may be in the form of salts, inorganic or organic materials, may be in the form of metal ions or metal-ligand forms, or may be in the form of a material comprising a metal atom, or any combination thereof.

In some embodiments, the XRF-identifiable marker comprises at least one metal salt or a material comprising at least one metal atom. Some examples of salts encompassed herein include, but are not limited to, potassium hydroxide, potassium iodide, potassium bromide, aluminum calcium hydroxide phosphite, hydrate calcium hydroxide, calcium butyrate, calcium chloride, calcium sulphoaluminate, 3,5-di-tert-butyl-4-hydroxybenzylphosphonic acid, monoethyl ester, calcium salt, titanium dioxide, titanium dioxide coated with a copolymer of n-octyltrichlorosilane and aminotris (methylenephosphonic acid) penta sodium salt, titanium nitride, titanium dioxide nanoparticles reacted with octyltriethoxysilane, manganese pyrophosphate, manganese chloride, manganese hypophosphite, manganese oxide, manganese hydroxide, brass, bronze, copper, stainless steel, tin and alloys of copper, tin and iron, iron oxide, iron phosphide, cobalt oxide, copper iodide, copper bromide, copper hydroxide phosphate, zinc sulphide, zinc hydroxide poly(zinc glycerolate) hexadecyltrimethylammonium bromide, sodium bromide, ammonium bromide, N,N'-bis(2,2,6,6-tetramethyl-4-piperidyl)hexamethylenediamine-1,2-dibromoethane copolymer.

In some embodiments, the XRF-identifiable marker comprises at least one metal salt or a material comprising at least one metal atom.

In some embodiments, the at least one metal salt is selected from zinc oxide, manganese stearate, manganese chloride, zinc diricinoleate, potassium bromide, sodium bromide, titanium oxide, titanium nitride, ammonium bromide and calcium butyrate.

In some embodiments, the at least one metal salt is selected from zinc oxide, manganese stearate, manganese chloride, potassium bromide, sodium bromide, titanium oxide, titanium nitride, ammonium bromide and calcium butyrate.

In some embodiments, the at least one metal salt is selected from a titanium oxide and a zinc oxide.

In some embodiments, the at least one metal salt is or comprises a titanium oxide.

In some embodiments, the XRF-identifiable marker is a material having a XRF signature and may be selected in a form which includes one or more elements that are identifiable by XRF. In some embodiments, the XRF-identifiable marker is or comprises at least one element of the periodic table of the elements which in response to x-ray or gamma-ray (primary radiation) radiation emits an x-ray signal (secondary radiation) with spectral features (i.e. peaks in a particular energy/wavelength) characteristic of the element (an x-ray response signal as XRF signature). An element having such response signal is considered XRF-sensitive.

The XRF signature may depend on the marking(s) (material compositions, concentrations, etc.) as well as the surface/structure of the specific product on or in which the markings has been embedded.

In some other embodiments, the XRF-identifiable marker is safe for human or animal use.

In some embodiments, the XRF-identifiable marker is an element or a material comprising one or more elements, the element having an electronic transition between atomic energy levels which generates an identifiable X-ray signal.

In some embodiments, the XRF-identifiable marker comprises at least one metal atom. In some embodiments, the XRF-identifiable marker is an atom or comprises at least one atom selected from Na, Si, P, S, Cl, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and Ce. In other embodiments, the XRF-identifiable marker is a material comprising one or more atoms selected from Na, Si, P, S, Cl, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and Ce.

In some embodiments, the XRF-identifiable marker is or comprises at least one atom selected from Co, Cu, Na, K, Zn, Ca, Mn and Ti.

In some embodiments, the XRF-identifiable marker is or comprises at least one atom selected from Na, K, Zn, Ca, Mn and Ti.

The amount of the XRF-identifiable marker is essentially homogenously distributed in the element. The XRF-identifiable marker may also be distributed in certain regions of the element.

In some embodiments, the XRF-identifiable marker is selected according to the materials listed in Table 1 below:

TABLE 1

A list of possible markers according to the invention, their exemplified concentration in the element (in this specific embodiment, the element is in the form of a film) and deviation of the general appearance of the marked film in comparison to an unmarked film.
* The films obtained are of 30 μm thickness.

| Marker | Concentration [ppm] | Appearance - [deviation from unmarked BOPP film] |
| --- | --- | --- |
| potassium bromide | 180 | 0 |
| sodium bromide | 150 | 0 |
| titanium oxide | 150 | 1 |
| manganese chloride | 200 | 0 |
| ammonium bromide | 180 | 1 |
| calcium butyrate | 180 | 1 |
| manganese stearate | 200 | 1 |
| titanium nitride | 200 | 1 |

The deviation in appearance of the element of the invention and neat element without addition of a marker is determined, according to the disclosed invention, when scored in a score test having a scale ranging from "0" to "5", where "0" denotes essentially no deviation in the element optical properties (its appearance in terms of transparency, haze, and gloss) or such a small deviation that cannot be detected by the naked eye, "1" denotes a small deviation in the optical properties (scores "0" and "1" are also referred herein as "substantially identical" as will be further detailed below), which may be detected by the naked eye but to an acceptable level, and "5" denotes a deviation in the optical properties that can be obviously detected by the naked eye at an unacceptable level (for example, opaqueness as defined below).

One of the optical properties that is referred to as not being affected by the addition of marking materials to the element of the invention is the element transparency. Generally, "transparency" refers to the physical property of allowing light to pass through the material without being scattered. An object's transparency can be determined by measuring the total transmittance. The total transmission of incident light on an object is the ratio of transmitted light to the incident light. A transparent element according to the invention is an element whose total light transmission is at least 80% (for example, when measured according to ASTM-D 1003-77). An opaque element is defined according to the disclosed invention as an element whose light transmission is at most 70%.

Alternatively, the transparency can also be determined in accordance to the disclosed invention by measuring the light transmittance through a material in terms of the total percentage of light passing through the material per given width.

Additionally or alternatively, an optical property referred to herein is the element's haze, which is the percentage of transmitted light that is scattered upon passing through the element at an angle of more than 30°.

Yet additionally, or alternatively, an optical property referred to herein is the element gloss, which is the ability of the element to reflect light in a mirror-like specular reflection, where the angle of the reflected light is equal to the angle of the incident light.

As appreciated, the element disclosed herein has surprisingly good optical properties, substantially identical to the optical properties of an element that is free of a marker. The term "optical property substantially identical" according to the disclosed invention, refers to a deviation of at least 90% in an optical property of an element that comprises a marker when compared to an unmarked element. For example, when the transparency of an unmarked element and marked element is 95% and 92% (measured as total transmittance), respectively, the two elements are referred to as having about 97% identical transparency.

In some embodiments, the element has at least one optical property (for example, transparency, haze and gloss) that is at least 90% identical to the at least one optical property of a polymer free of said at least one XRF-identifiable marker (also denoted herein as the score "0").

In some embodiments, the element has at least one optical property (for example, transparency, haze and gloss) that is at least 95% identical to the at least one optical property of a polymer free of said at least one XRF-identifiable marker, at times, at least 92%, at least 93%, at least 94%, at least 96%, at least 97% or at least 98%.

As referred to herein, the term "substantially identical" should not be limited to identity in the elements optical properties, but should encompass also any property originating in an unmarked element, including, density, thickness, strength, hardness, surface energy, moisture barrier (water vapor and oxygen permeability), etc.

It is generally known in the art that low levels of impurities, such as aluminum, silicon, titanium or boron residues, may influence the optical properties of an element, such properties include the transparency, haziness, opaqueness. In some embodiments, the film disclosed herein has a haze of not more than 10 or a transparency of at least 90% (when both are measured, for example, according to ASTM D 1003-92).

Table 2 below displays some XRF-identifiable markers of the disclosed invention that are capable of maintaining similar physical properties in a polymeric element to those of an unmarked polymeric element. Namely, XRF-identifiable markers may be added to the element of the disclosed invention without negatively affecting (or very slightly affecting) the element's appearance.

As the marker concentration can affect the optical properties of the element, by utilizing the marker described herein at a suitable concentration, a transparent element is obtained.

The concentrations or amounts of the XRF-identifiable marker in the element according to the invention is between 50 and 300 ppm.

In some embodiments, the element comprises at least one XRF-identifiable marker in a concentration between 50 and 300 ppm, between 50 and 290 ppm, between 50 and 280 ppm, between 50 and 270 ppm, between 50 and 260 ppm, between 50 and 250 ppm, between 50 and 240 ppm, between 50 and 230 ppm, between 50 and 220 ppm, between 50 and 210 ppm or between 50 and 200 ppm.

In some embodiments, the element comprises at least one XRF-identifiable marker in a concentration between 50 and 190 ppm, 50 and 180 ppm, 50 and 170 ppm, 50 and 160 ppm, 50 and 150 ppm, 60 and 200 ppm, 60 and 190 ppm, 60 and 180 ppm, 60 and 170 ppm, 60 and 160 ppm, 60 and 150 ppm, 100 and 200 ppm, 100 and 170 ppm, 100 and 160 ppm.

In some embodiments, the element comprises between 50 and 200 ppm of at least one XRF-identifiable marker.

As mentioned above, when a transparent polymeric element comprises an amount of XRF-identifiable marker that is not in the range disclosed herein, the appearance of the element obtained may be deviated in comparison to an unmarked element. For example, as shown in Table 2 below inserting certain type of markers in concentrations higher than a minimal concentration presented in Table 2 (or, in some cases, concentrations lower than the range specified herein) introduces visible effects, such as coloring, haze or opaqueness to the element. Such effects may be used to generate desirable affects. For example, a colored stripe on a plastic element used for packaging, such as colored tearable stripe in cigarette packs. A visible affect may be used for introducing a number of markings in a single product. For example, in a multi-layered film and may be used also use for visibly marking a localized marked region with an XRF marking in addition to a transparent delocalized XRF mark.

TABLE 2

Markers at various amounts used in obtaining films

| Marker | Minimal Concentration [ppm] |
|---|---|
| potassium bromide | 180 |
| sodium bromide | 150 |
| TiO$_2$ | 150 |
| manganese chloride | 200 |
| ammonium bromide | 180 |
| calcium butyrate | 180 |
| manganese stearate | 200 |
| titanium nitride | 200 |
| zinc sulphide | 150 |

TABLE 2-continued

Markers at various amounts used in obtaining films

| Marker | Minimal Concentration [ppm] |
|---|---|
| calcium chloride | 180 |
| copper iodide | 180 |
| cobalt oxide | 150 |

The ratio between the XRF-identifiable marker and the polymer in the element is sufficient to yield between 50 and 300 ppm XRF-identifiable marker in the polymer.

The element may further comprise an additive for providing a desirable visual effect or physical property.

In some embodiments, the element further comprises an additive selected from an anti-blocking agents, organic pigments, inorganic pigments, flow improving additives, enhancing mechanical properties additives, non-sticky adhesives, adhesion promoters, adhesion inhibitors, lubricant additives, abrasion additives, anti-static additives, marking additives, electrical conductivity additives, thermal conductivity additives, magnetic improving additives, insulating materials additives, blowing agents, accelerators, catalysts, anti-oxidant, a UV-stabilizer, a flame retardant, a pigment, a stabilizer, wetting agents, empower, diluents, wetting improvers, dispersing agents, surfactants, diluents agents, improving viscosity additives and fillers.

As mentioned above, reference to the "substantially identical" should not be limited to a certain property, such as anyone of optical properties, but should encompass any property originating in an unmarked element, including, density, thickness, strength, hardness, surface energy, moisture barrier (water vapor and oxygen permeability), etc. Thus, it is yet another goal of the invention to provide an element comprising XRF-markers having a desired density and thickness. The addition of a marker typically has an effect on the density and thickness of transparent polymers. The inventors have discovered that the element disclosed herein maintains a substantially identical density to that of an unmarked element.

With respect to other "substantially identical" properties according to the disclosed invention, the thickness of the marked element is substantially identical to the thickness of an unmarked element of the same polymer. Although the density of an element may be altered as a result of the addition of salts to the element, the invention disclosed herein provides an element having a thickness in the range of 10 and 100 μm. In some embodiments, the element thickness is in the range of 10 and 90 μm, 10 and 80 μm, 10 and 70 μm, 10 and 60 μm, 10 and 50 μm, 10 and 40 μm, 10 and 30 μm, 10 and 25 μm, 20 and 90 μm, 20 and 80 μm, 20 and 70 μm, 20 and 60 μm, 20 and 50 μm, 20 and 40 μm, 20 and 30 μm, 25 and 90 μm, 25 and 80 μm, 25 and 70 μm, 25 and 70, 25 and 60 μm, 25 and 50 μm, 25 and 40 μm, 25 and 35 μm, 30 and 60 μm, 30 and 50 μm or 30 and 40 μm.

In some embodiments, the element (for example, a film) comprises BOP and between 50 and 300 ppm at least one XRF-identifiable marker, wherein the thickness is between 10 and 100 μm. In such embodiments, the thickness is between 10 and 90 μm, 10 and 80 μm, 10 and 70 μm, 10 and 60 μm, 10 and 50 μm, 10 and 40 μm, 10 and 30 μm, 10 and 25 μm, 20 and 90 μm, 20 and 80 μm, 20 and 70 μm, 20 and 60 μm, 20 and 50 μm, 20 and 40 μm, 20 and 30 μm, 25 and 90 μm, 25 and 80 μm, 25 and 70 μm, 25 and 70, 25 and 60 μm, 25 and 50 μm, 25 and 40 μm, 25 and 35 μm, 30 and 60 μm, 30 and 50 μm or 30 and 40 μm.

A further aim of the invention is to provide an element with improved mechanical properties, such as but not limited to, tensile strength and modulus, flexural strength and modulus, hardness, toughness, elongation, etc.

In another of its aspects, there is provided a laminate comprising at least one layer that comprises the element disclosed herein. The element may be combined with at least one additional identical layer or with at least one layer that is different. The element may be a first base layer bonded to other layers or may be an intermediate layer disposed between other layers of the laminate. The combined layers provide a laminate that does not substantially deteriorate the physical properties of a single layer of the element. Thus, in some embodiments, the laminate further comprises at least one transparent layer. In such embodiments, the at least one transparent layer is or comprises at least one of a UV-blocking layer, adhesive layer, and an oxygen barrier layer.

At times, in order to bond an additional layer to the element of the invention, modifying of the surface energy of the element may be required in order to improve the adhesion of any one of the layers by techniques typically known in the art (for example, by corona).

The element disclosed herein may be utilized in applications commonly known in the field of transparent polymeric elements, including packaging films for marking commercial products typically used by humans or animals, such as food products, food packaging, pharmaceuticals, cosmetics, veterinary products and others. However, the technology described herein is not limited only to this specific application and may be utilized in other various applications, such as, electrical applications, printing, flower packing, pressure sensitive tapes and lamination, disposable packaging of medicinal products, medical devices, etc.

Thus, in another of its aspects, provided herein is an element for use in packaging a product.

In some embodiments, the product is selected from a food product, cosmetic product, pharmaceutical product, sealing products, electronic products, consumer products and pouch packages.

The XRF-identifiable element provided herein can be utilized for marking and authenticating transparent polymeric products which provide an indication whether the product has a defect, whether the product has undergone deviation from a predefined continuous manufacturing process, or for detecting and identifying deviations in products after manufacture due to exposure to certain conditions.

Thus, in another aspect, there is provided a transparent element for use in marking an article.

In some embodiments, the marking comprises authenticating or identifying an article.

Although not limited to only the following process, the element according to the present invention is prepared from a mixture comprising polymers and XRF markers of the kind described herein by extrusion techniques which involve depositing a relatively thin-layer of the mixture as a stand-alone element or depositing the layer on a surface region of a product. The surface upon which the element is deposited may be any surface which adheres to the element, such as glass, metals, ceramics, polymers or paper. Elements resulting from this procedure are flexible and of excellent physical properties. The elements may be further oriented readily by stretching in one or preferably two mutually perpendicular directions.

Thus, in another of its aspects, the invention provides a process for producing an element, the process comprises:

(i) extruding a mixture comprising a polymer and at least one XRF-identifiable marker to obtain an extruded element; and
(ii) optionally applying mono and/or biaxial stretching orientation to obtain an element.

In some embodiments, the mono and/or biaxial stretching comprises one or more stretching orientations selected from longitudinally stretching and transversely stretching.

The markers utilized in accordance with the present invention may be dispersed in the polymer disclosed herein or in a formulation for providing the element according to the disclosed invention.

In another of its aspects, there is provided a formulation comprising a polymer and at least one XRF-identifiable marker in an amount sufficient to yield a concentration of between 50 and 300 ppm of XRF-identifiable marker in a transparent element comprising the polymer and the at least one XRF-identifiable marker.

The concentrations or amounts of the XRF-identifiable marker in the formulation according to the invention is between 50 and 300 ppm.

In some embodiments, the formulation comprises at least one XRF-identifiable marker in a concentration between 50 and 300 ppm, between 50 and 290 ppm, between 50 and 280 ppm, between 50 and 270 ppm, between 50 and 260 ppm, between 50 and 250 ppm, between 50 and 240 ppm, between 50 and 230 ppm, between 50 and 220 ppm, between 50 and 210 ppm or between 50 and 200 ppm.

In some embodiments, the formulation comprises at least one XRF-identifiable marker in a concentration between 50 and 190 ppm, 50 and 180 ppm, 50 and 170 ppm, 50 and 160 ppm, 50 and 150 ppm, 60 and 200 ppm, 60 and 190 ppm, 60 and 180 ppm, 60 and 170 ppm, 60 and 160 ppm, 60 and 150 ppm, 100 and 200 ppm, 100 and 170 ppm, 100 and 160 ppm.

In some embodiments, the formulation comprises between 50 and 200 ppm of at least one XRF-identifiable marker.

The XRF-identifiable markers utilized in the present invention may be dispersed in a formulation for providing the polymeric element. Materials suitable as XRF-identifiable markers in the formulation according to the invention may be in the same form as the XRF markers mentioned herein above, i.e. in the form of salts, inorganic or organic materials, metal ions, metal-ligand forms or in a material comprising a metal atom.

Additionally, the polymers suitable for the formulation according to the invention may be the same as those detailed herein above.

In some embodiments, the polymer is a thermoplastic material.

In some embodiments, the formulation comprising at most 50-300 ppm (0.005-0.03% w/w) of the at least one XRF-identifiable marker.

The formulation may further comprise an additive for providing a desirable visual effect or physical property in an element prepared from said formulation.

In some embodiments, the formulation further comprises an additive selected from an anti-blocking agents, organic pigments, inorganic pigments, flow improving additives, enhancing mechanical properties additives, non-sticky adhesives, adhesion promoters, adhesion inhibitors, lubricant additives, abrasion additives, anti-static additives, marking additives, electrical conductivity additives, thermal conductivity additives, magnetic improving additives, insulating materials additives, blowing agents, accelerators, catalysts, anti-oxidant, a UV-stabilizer, a flame retardant, a pigment, a stabilizer, wetting agents, empower, diluents, wetting improvers, dispersing agents, surfactants, diluents agents, improving viscosity additives and fillers.

The markers utilized in accordance with the present invention may be dispersed in the polymer disclosed herein or in a formulation for providing the element according to the disclosed invention (e.g., by dispersing the marker in a plastic solution, extrusion, kneading, etc). As such, the markers may be integrated into the polymer material or applied to the surface of an element made of a polymer. To improve the dispersion, a concentrate of the marker can first be prepared and then blended with the plastic in any standard processing method, such as extruding, molding, calendaring, etc.

Typically, in an extrusion process, raw plastic is melted and formed into a continuous profile. The raw feedstock material is a solid plastic material typically in the form of resin, which is fed from a top mounted hopper into the barrel of the extruder. Additives such as colorants and UV inhibitors (in liquid, powder or pellet form) can be either mixed into the resin prior to arriving at the hopper or fed to the process via a separate feeder.

Extrusion involves a helical feed screw that turns inside the barrel (typically at a speed of up to 120 rpm). A screw or twin screw system advances the material through the barrel where it is heated to a temperature above the melting point of the plastic and compressed. The molten plastic material is then forced through an orifice.

The XRF markers of the invention may be added to the resin feedstock or to the secondary feeder for additives in the form of a resin, pellets, powder or in liquid form. Furthermore, the XRF markers may be prepared and included in pellets containing additional additives.

In yet another aspect, there is provided a masterbatch mixture (i.e., a concentrated mixture) comprising at least one XRF-identifiable marker and a material selected from a polymer, a pre-polymer, a monomer, an oligomer and an additive; said mixture comprises between 0.5% and 10% of said at least one XRF-identifiable marker. In some embodiments, said mixture comprises at least one XRF-identifiable marker between 0.5% and 8%, between 0.5% and 7%, between 0.5% and 6%, between 0.5% and 5%, between 1% and 5%, between 1% and 6%, between 1% and 7%, between 1% and 8%, between 2% and 5%, between 2% and 6%, between 2% and 7%, between 2% and 8%, between 2% and 9%, between 2% and 10%, between 3% and 7%, between 3% and 8%, or between 3% and 9%.

Such suitable materials are those that are combined with a XRF-identifiable marker at sufficient amounts to yield a transparent element.

In some embodiments, the additive is selected from anti-blocking agents, organic pigments, inorganic pigments, flow improving additives, enhancing mechanical properties additives, non-sticky adhesives, adhesion promoters, adhesion inhibitors, lubricant additives, abrasion additives, anti-static additives, marking additives, electrical conductivity additives, thermal conductivity additives, magnetic improving additives, insulating materials additives, blowing agents, accelerators, catalysts, anti-oxidant, a UV-stabilizer, a flame retardant, a pigment, a stabilizer, wetting agents, empower, diluents, wetting improvers, dispersing agents, surfactants, diluents agents, improving viscosity additives and fillers.

In some embodiments, the masterbatch mixture being further added to a material selected from a polymer, a pre-polymer, a monomer, homopolymer and an oligomer. Examples of such materials are those known in the field of extrusion, molding, spinning, kneading. In some embodiments, the material is a thermoplastic material or results in a thermoplastic material under sufficient conditions.

The markers may be fed into the manufacturing process together with other additives or alternatively may be inserted into the polymer resin prior to manufacturing.

In some embodiments, the material is in a form selected from resins, pellets, powders and liquids.

As above mentioned, the XRF-identifiable element provided herein can be utilized for marking and authenticating transparent polymeric products which provide an indication whether the product has a defect, whether the product has undergone deviation from a predefined continuous manufacturing process, or for detecting and identifying deviations in products after manufacture due to exposure to certain conditions.

The XRF-identifiable mark formed on an article, e.g., a transparent thermoplastic product, is said to have a predefined characteristic that is identifiable by XRF and which permits a determination of, for example, deviation from the predefined specification of manufacture of the product or degradation of the product. The predefined characteristic may be selected from concentration of the XRF marker, the mark structure, size, shape, or chemical composition of the mark. Where a mark has been identified as being modified, the product may be considered to have been degraded or deviated from its predefined manufacture specification.

The resulting defective product may exhibit variations in the thickness of the product or wall thickness, bubbles and pits, contamination by foreign materials, inhomogeneity, and particles of undispersed additives.

The mark or pattern formed in/on the article is responsive to at least one external stimulus such as improper installation or operation of the extruder, poor mixing of the components or addition of materials, over-heating, surging temperature, oxygen, moisture, mechanical treatment, repackaging, and others.

In some embodiments, the XRF-identifiable pattern may be selected to have a predefined shape, size and material constitution (namely, which marker material is used and at what concentration), which change upon exposure to the external stimulus. In other words, the predefined pattern has a first characteristic that is selected as an authentication mark which would transition from its formed shape, size and constitution to a different unpredictable pattern upon any deviation or degradation of the product.

Thus, in another aspect, there is provided a method for authenticating a transparent article with a XRF-identifiable mark, the method comprising:
 (i) forming an XRF-identifiable pattern on at least one region of the transparent article, said XRF-identifiable pattern having a predefined characteristic responsive to an external stimulus;
 (ii) irradiating said article with X-Ray or Gamma-Ray radiation at predetermined intervals;
 (iii) detecting an X-Ray or Gamma-Ray signal arriving from the article in response to the X-Ray or Gamma-Ray radiation applied to the article;
 (iv) applying spectral processing to the detected radiation signal to obtain data indicative of the presence, absence or any change in the predefined characteristic.

The concentrations or amounts of the XRF-identifiable markers of the invention may be set according to a preselected encryption code, which can be measured by XRF analysis in the authentication stage. In general, the marking pattern may include one or more markers with preselected concentrations within the range of 50 to 300 ppm; the preselected concentration may be adapted or preset to code for a specific article identification.

The markers of the present invention may be added or applied to a transparent article such that their concentration on the surface or in the bulk of the article are set according to a preselected code. Therefore, information can be encoded by using the markers. In particular information relating to deviation from the manufacturing.

The sensitivity of the detection and the resolution of the measurement of the concentration of the marker can be increased by various methods for processing and enhancing the XRF signals received by the XRF reader, improving for instance the signal-to-noise ratio. For example, the methods described in International application PCT/IL2016/050340, incorporated herein by reference.

A measurement of the concentration of the XRF markers, in various locations and times of the continuous article can exhibit variations and deviations, for example, when the thickness of the article varies. Variations in thickness of an article results in variations in the measured radiation emitted by the markers. Other examples in variations or reduction in the measured concentrations of the XRF markers may also result from inhomogeneity and/or poor dispersion of additives, contamination and foreign materials which have been accidentally introduced into the product during production.

Some other examples of measurements of the concentration of the XRF markers in an article include after production use and may also provide indication as to possible degradation of the product due to exposure to UV light, heat, humidity, etc.

The XRF measurement may be taken at preselected intervals by an XRF analyzer at various points. Alternatively, the XRF measurements can be carried out 'on-line' by an XRF analyzer which continuously measures the article, and averages the x-ray counts (or counts per second—cps) arriving from the markers, over a preselected time period which may vary from milliseconds to minutes.

The invention provides a transparent article having at least one XRF-identifiable pattern associated therewith, the pattern having a predefined characteristic, as a code, which identifies the article based on one or more of the following: chemical composition of the pattern, concentration of any one component present in the pattern, the pattern position, the pattern shape and others.

In some embodiments, the predefined characteristic is responsive to an external stimulus by transitioning from the predefined (first) characteristic to a second characteristic, said transition being identifiable by XRF and indicative of exposure to said external stimulus.

In yet another aspect, there is provided a method for marking a transparent element with an XRF-identifiable pattern, the method comprising forming on at least a region of the element a pattern of at least one XRF-identifiable marker, the pattern having a first characteristic being responsive to an external stimulus by transitioning from the first characteristic to a second characteristic, said transition being identifiable by XRF and indicative of exposure to said external stimulus.

The XRF method may further comprise: (i) filtering a wavelength spectral profile of a detected portion of the X-Ray signal arriving from the article in response to X-Ray or Gamma-Ray radiation applied to the article to suppress trend and periodic components from the wavelength spectral profile to thereby obtain a filtered profile; and (ii) identifying one or more peaks in the filtered profiled satisfying a predetermined characteristic thereby enabling utilizing wavelengths of the one or more peaks to identify signatures of materials included in the article.

In some embodiments, the method comprises irradiating the article with the X-Ray or Gamma-Ray radiation; detecting a portion of an X-Ray signal arriving from the article in response to the radiation applied to the article; and applying spectral processing to the detected X-Ray signal to obtain data indicative of wavelength spectral profile thereof within a certain X-Ray band.

In some embodiments, the wavelengths and optionally also the magnitudes of the one or more peaks are used to determine material data indicative of types and possibly also concentrations of materials included in the article and thereby any deviations or degradation the article has undergone.

DETAILED DESCRIPTION OF EMBODIMENTS

Example 1

BOPP film comprising $TiO_2$ marker (trade name Ti-Pure R104). The material together with the PP were compounded to mono-concentrate by a MFR 10-12 PP homopolymer carrier. The marker content in the masterbatch was normalized to 1 wt % of the metal. The mono-concentrate were used for producing a monolayer cast film of 30 µm thickness at marker concentration of 100 ppm. The film did not show any significant changes in appearance from a reference film similarly prepared with no marker added.

The invention claimed is:

1. A transparent element consisting of a polymer and at least one XRF-identifiable marker,
    said element comprising between 50 and 300 ppm of said at least one XRF-identifiable marker,
    said element having at least one optical property substantially identical to the at least one optical property of a polymer free of said at least one XRF-identifiable marker, wherein the at least one XRF-identifiable marker is at least one XRF-identifiable metal salt.

2. The element according to claim 1, wherein the polymer is selected from polyolefins, polyamides, polystyrenes, polyesters, polycarbonates, polyethylene terephthalates, polyurethanes, polyamides, polyimides, polyacrylonitriles polyvinyl alcohols and biaxially oriented polymer.

3. The element according to claim 2, wherein the polyolefin is selected from polypropylene and polyethylene.

4. The element according to claim 1, wherein the polymer is biaxially oriented polypropylene.

5. The element according to claim 1, wherein the at least one XRF-identifiable marker comprises an atom selected from Co, Cu, Na, K, Zn, Ca, Mn and Ti.

6. The element according to claim 4, wherein the element is a film having a thickness of 20-60 µm.

7. The element according to claim 1, wherein the element is a film having a thickness of 10-100 µm.

8. The element according to claim 1, wherein the at least one optical property is selected from transparency, haziness and glossiness.

9. A transparent element according to claim 1, for use in marking an article.

10. The element for use according to claim 9, wherein the marking comprises authenticating or identifying an article.

11. An element according to claim 1, for use in packaging a product, the element being optionally a film.

12. The element for use according to claim 9, wherein the product is selected from a food product, cosmetic product, pharmaceutical product.

13. A masterbatch mixture comprising at least one XRF-identifiable marker, a material selected from a polymer, a pre-polymer, a monomer, and an oligomer and an additive, wherein the at least one XRF-identifiable marker is at least one XRF-identifiable metal salt;

said mixture comprises between 0.5 and 10% w/w of said at least one XRF-identifiable marker.

14. The masterbatch mixture according to claim 13, wherein the at least one XRF-identifiable metal salt is selected from potassium hydroxide, potassium iodide, potassium bromide, aluminum calcium hydroxide phosphite, hydrate calcium hydroxide, calcium butyrate, calcium chloride, calcium salt, titanium dioxide coated with a copolymer of n-octyltrichlorosilane and aminotris(methylenephosphonic acid) penta sodium salt, manganese pyrophosphate, manganese chloride, manganese hypophosphite, manganese hydroxide, copper iodide, copper bromide, copper hydroxide phosphate, zinc sulphide, zinc hydroxide poly(zinc glycerolate) hexadecyltrimethylammonium bromide, sodium bromide and ammonium bromide.

15. A method for authenticating a transparent article with a XRF-identifiable marker, the method comprising:
(i) irradiating with X-Ray or Gamma-Ray radiation at predetermined intervals an XRF-identifiable pattern formed on at least one region of a transparent article, said XRF-identifiable pattern having a predefined characteristic responsive to an external stimulus;
(ii) detecting an X-Ray or Gamma-Ray signal arriving from the article in response to the X-Ray or Gamma-Ray radiation applied to the article;
(iii) applying spectral processing to the detected radiation signal to obtain data indicative of the presence, absence or any change in the predefined characteristic.

16. The method according to claim 15, the method comprising:
(i) forming an XRF-identifiable pattern on at least one region of the transparent article, said XRF-identifiable pattern having a predefined characteristic responsive to an external stimulus;
(ii) irradiating said article with X-Ray or Gamma-Ray radiation at predetermined intervals;
(iii) detecting an X-Ray or Gamma-Ray signal arriving from the article in response to the X-Ray or Gamma-Ray radiation applied to the article;
(iv) applying spectral processing to the detected radiation signal to obtain data indicative of the presence, absence or any change in the predefined characteristic.

17. The method according to claim 15, wherein the XRF-identifiable marker is a XRF-identifiable metal salt.

18. The method according to claim 15, further comprising forming an XRF-identifiable pattern on at least one region of the transparent article, said XRF-identifiable pattern having a predefined characteristic responsive to an external stimulus.

* * * * *